United States Patent [19]

Jackson

[11] Patent Number: 4,953,449
[45] Date of Patent: Sep. 4, 1990

[54] FILTERED POSITIVE VENTILATION SYSTEM FOR VEHICLE

[76] Inventor: Ernest E. Jackson, 4505 Lower Huntington Rd., Fort Wayne, Ind. 46809

[21] Appl. No.: 375,713
[22] Filed: Jul. 5, 1989
[51] Int. Cl.⁵ .............................................. B60H 3/06
[52] U.S. Cl. ........................................ 98/2.11; 98/2.14
[58] Field of Search ...................... 98/2.11, 2.14, 2.15

[56] References Cited

U.S. PATENT DOCUMENTS

| | | | |
|---|---|---|---|
| 2,087,651 | 7/1937 | Mygland | 98/2.15 |
| 2,128,335 | 8/1938 | Thayer | 98/2.14 X |
| 2,172,939 | 9/1939 | Lintern et al. | 98/2.14 |
| 2,232,108 | 2/1941 | Giacomini | 98/2.14 |

FOREIGN PATENT DOCUMENTS 197712 12/1977 U.S.S.R. ............................... 98/2.14

Primary Examiner—Harold Joyce
Attorney, Agent, or Firm—Jeffers, Hoffman & Niewyk

[57] ABSTRACT

A ventilation system for a motor vehicle includes an air intake opening through a wall of the vehicle and an air scoop to direct air thereinto, the intake opening being the only deliberate air permeable opening in the vehicle. A filter bag is connected to the air intake via a conduit, such that all air entering the vehicle through the intake opening is filtered of dust by the filter bag. Clean intake air is thereby used to generate a positive pressure in the vehicle which prevents the infiltration of dust and air into the vehicle through incidental cracks and crevices.

9 Claims, 2 Drawing Sheets

FILTERED POSITIVE VENTILATION SYSTEM FOR VEHICLE

BACKGROUND OF THE INVENTION

The present invention relates generally to ventilation systems for motor vehicles, and more particularly to a ventilation system for a motor vehicle in which positive pressurization of the vehicle interior is accomplished along with particulate filtration of incoming air.

When motor vehicles are operated in geographical areas in which unimproved roads are common and in which the climate is often dry, dust clouds are unavoidably raised by air currents generated by the passing of the vehicle over the dry and dusty road surface. Large amounts of dust tend to infiltrate into the interior passenger or cargo compartments of vehicles under such conditions, quickly soiling the interior and being detrimental to the comfort and health of the occupants. This can be an especially acute problem in trailers, recreational vehicles, vans, and other large vehicles because of the many potential air entry points which can exist around windows, doors and various fittings.

It is relatively difficult to provide adequate sealing against air infiltration around doors and windows of trailers and recreational vehicles in an economical manner since the nature of the vehicle does not justify costly expenditures for sealing such as might be appropriate in a passenger automobile and the number of dust entry points is prohibitively large. Consequently, alleviation of the problem of dust infiltration preferably should be approached from a different perspective than that of merely improving the mechanical seal around obvious entry points such as windows. The present invention takes such a different approach.

It is desireable that prevention or alleviation of dust entry into a vehicle be accomplished despite imperfect seals around doors and windows and despite the presence of undesired but nevertheless inevitable small holes and cracks in the shell of the vehicle. The present invention makes this desire a reality.

SUMMARY OF THE INVENTION

The invention, according to one aspect thereof, involves a filtered positive ventilation system for a vehicle for alleviating entry of dust therein which includes an air intake opening through a wall of the motor vehicle where the intake opening is the only deliberate air permeable opening in the vehicle. An air scoop is connected to the wall of the vehicle and communicates with the intake opening, the air scoop being arranged and configured to direct air impinging thereon due to forward motion of the motor vehicle into the intake opening. Conduit means are disposed interiorly of the vehicle and communicate at one end exclusively with the intake opening. An air filter means is disposed interiorly of the vehicle and communicate exclusively with the other end of the conduit means and is sealed thereto such that all air entering the vehicle through the intake opening necessarily passes through the air filter means. The filter means has filtration characteristics sufficient for removal of particulates. A positive pressure is generated in the vehicle by forward motion thereof to prevent air and dust infiltration into the vehicle through incidental cracks and crevices, and such air as is deliberately permitted into the vehicle is filtered of particulates.

It is an object of the present invention to provide an improved ventilation system for a vehicle which maintains the aesthetics, comfort and healthful environment of the vehicle by alleviating the accumulation of dust and other particulates therein.

Other objects and advantages of the present invention shall be apparent from the following descriptions.

DESCRIPTION OF THE PREFERRED EMBODIMENT

Figure 1:
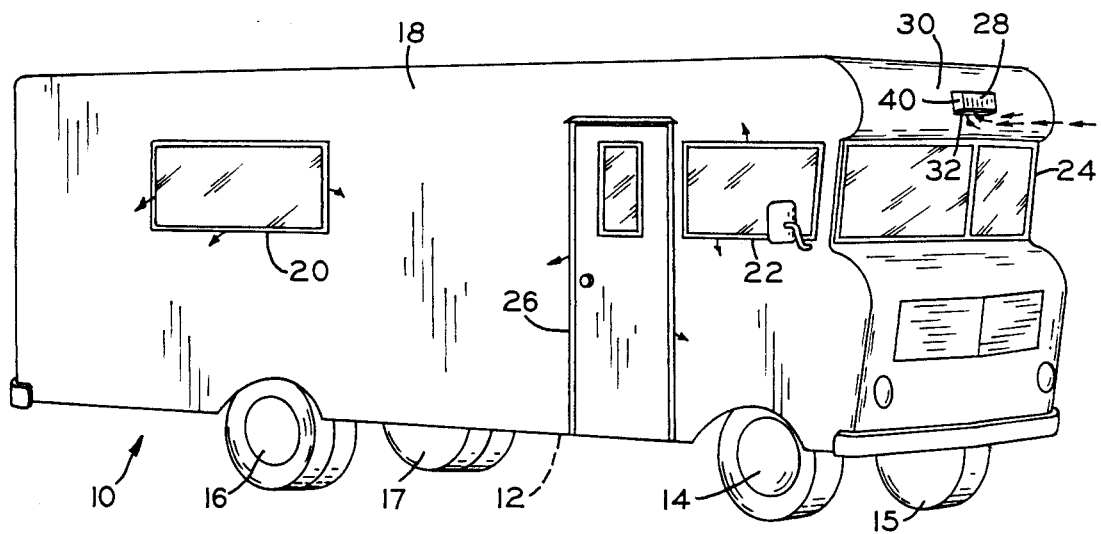
FIG. 1 is a perspective view of the outside of a motor home recreational vehicle incorporating the present invention in accordance with a first embodiment thereof.

Referring in particular to FIG. 1, there is illustrated a motor home recreational vehicle 10 mounted on a chassis 12 having front wheels 14 and 15 mounted for steering and tandem rear wheels 16 and 17 in driven engagement with the vehicle engine. Vehicle 10 includes a body shell 18 having a plurality of openings therein occluded by windows 20 and 22, for instance, windshield 24 and door 26.

Disposed above the cab and windshield 24 on the front of body shell 18 is an air scoop 28 mounted on a front face 30 of body shell 18. Front face 30 slopes upwardly and rearwardly such that ram air encountering front face 30 as vehicle 10 moves forward is deflected upwardly. Air scoop 28 extends forward of front face 30 and has a downward facing opening which receives air deflected upwardly by front face 30.

Air scoop 28 communicates with the interior passenger and cargo space of vehicle 10 such that air entering air scoop 28 causes a pressurization of the interior space of vehicle 10 relative to the ambient air pressure. The resulting positive pressurization of vehicle 10 causes a reversal of the direction of air infiltration which might otherwise occur through cracks and other openings in body shell 18. For instance, as is illustrated in FIG. 1, pressurized air in vehicle 10 escapes to the outside around windows 20 and 22 and door 26, as shown by the arrows, through whatever small openings or sealing defects may incidentally be present. As a consequence of the outward air flow through the incidental openings in body shell 10, infiltration of air and dust is prevented at all body shell openings except air scoop 28. Therefore, the present invention obviates the necessity of providing high quality mechanical seals at a large number of known and unknown entry points by providing blanket protection for the whole vehicle through an air pressure differential type seal, thereby localizing the problem of dust control to a single air entry point. The measure for controlling entry of dust at that one air entry point is explained below.

Figure 2:
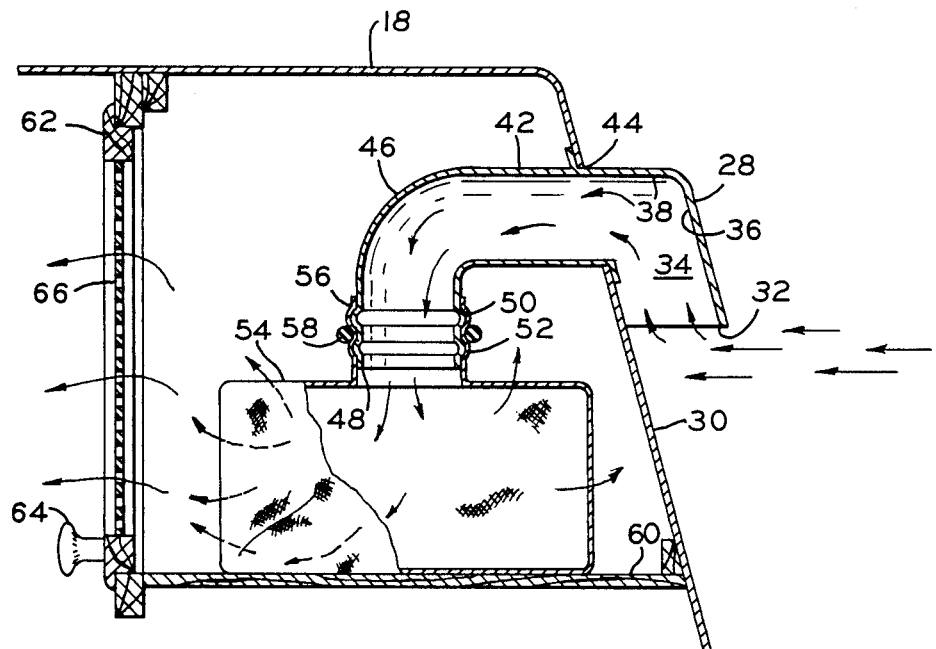
FIG. 2 is cross-sectional view a portion of the vehicle of FIG. 1, particularly showing the storage area above the cab and the air intake and filtration device of the present invention.

Referring in particular to FIG. 2, there is shown a cross-sectional view of air scoop 28 and the associated nearby body shell structure, as well as a preferred embodiment of an air intake filter. Scoop 28 has a downward facing opening 32 which communicates with an upwardly extending passageway 34 defined by a front wall 36, a top wall 38 and side walls 40 (see FIG. 1). Front wall 30 of body shell 18 effectively provides a rear wall for passageway 34. The downward facing opening of air scoop 28 prevents the entry of water into vehicle 10. A horizontally oriented conduit 42 in communication with passageway 34 extends through an opening 44 in front wall 30 into the interior of vehicle 10. The interface between conduit 42 and opening 44 is thoroughly sealed to prevent air leakage at that point. Opening 44 is the only deliberate forward facing air permeable opening in the vehicle so that all air entering the vehicle due to impingement on the moving vehicle enters only through opening 44. Conduit 42 has an elbow bend 46 at the rear end thereof and undergoes an approximately 90° downward bend such that the rear opening 48 of conduit 42 extends downwardly. Located on the outside surface of conduit 42 intermediate opening 48 and elbow bend 46 are a pair of spaced annular protrusions 50 and 52.

Received over the rear downward extending end of conduit 42 is a hollow filter bag 54 having a neck portion 56 overlying in relatively tight fitting engagement annular protrusions 50 and 52. Disposed over neck portion 56 and intermediate protrusions 50 and 52 is an elastic band 58 which serves both to hold neck portion 56 of filter bag 56 onto conduit 42 and to seal neck portion 56 to conduit 42 against air leaks. A horizontal shelf attached to front wall 30 and body shell 18 supports filter bag 54.

A hinged bulkhead door 62 having a handle 64 and an air pervious screen 66 conceals filter bag 54 from the rest of the interior of vehicle 10 while at the same time permitting free air flow from filter bag 54 to the interior of vehicle 10.

Filter bag 54 is composed of a relatively thin material having relatively high air flow characteristics and yet having the ability to filter out of the incoming air small particles which otherwise would result in an unsightly accumulation of dust in the interior of vehicle 10. A suitable filter material would be a filter paper such as is commonly employed in household vacuum cleaner bags. Other suitable filter materials will be apparent to one of ordinary skill in the art with the choice of material being dictated by such factors as expense, air flow characteristics of the new and dust laden filter material, minimum size of particle removed, etc.

Alternatively, the connection between filter bag 54 and conduit 42 can be in the nature of a quick disconnect fitting such as one finds with vacuum cleaner hoses and related attachments. Such a quick disconnect fitting would facilitate changing of the filter bag.

Figure 3:
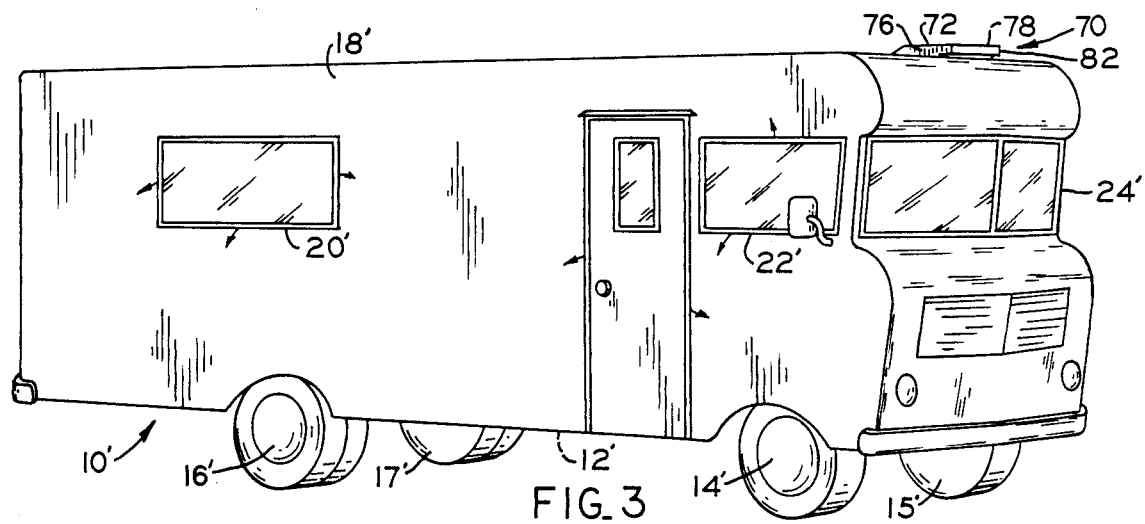
FIG. 3 is a perspective view of the outside of a motor home recreational vehicle incorporating the present invention in accordance with an alternative embodiment thereof.
Figure 4:
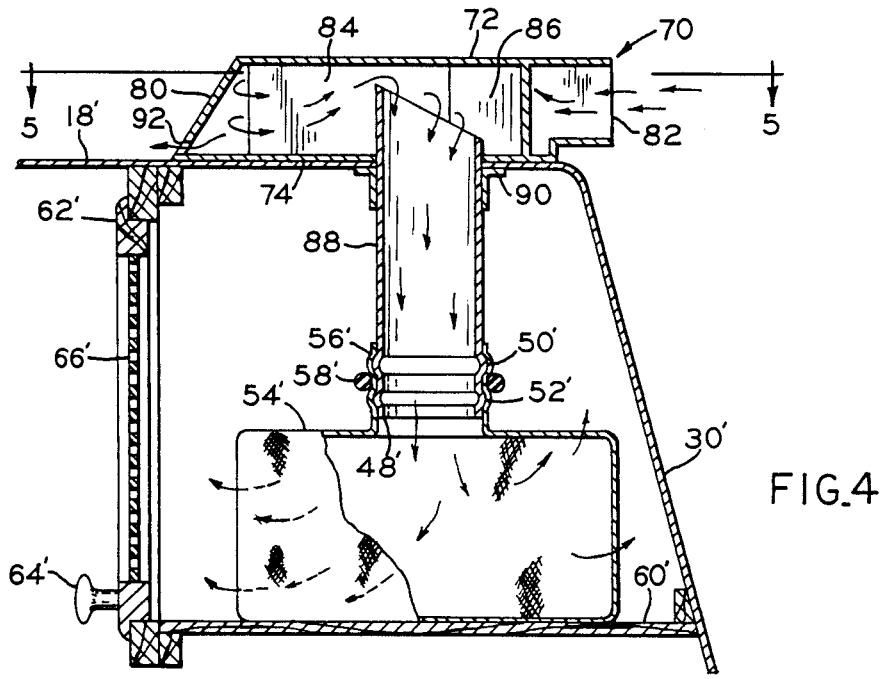
FIG. 4 is cross-sectional view a portion of the vehicle of FIG. 3, taken along section line 4—4 of FIG. 5 and viewed in the direction of the arrows, and particularly showing the storage area above the cab and the air intake and filtration device of the present invention.
Figure 5:
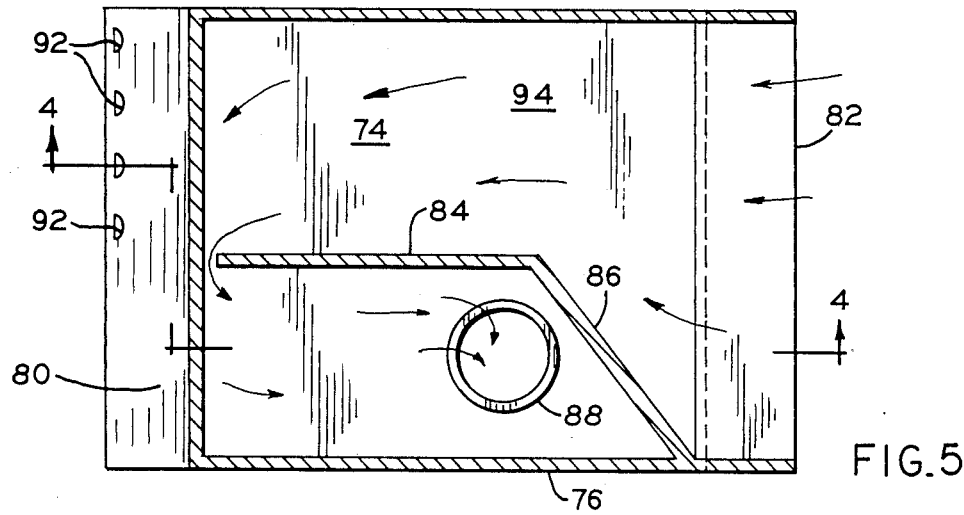
FIG. 5 is a cross-sectional view of the air scoop of FIG. 4, taken along section line 5—5 of FIG. 4 and viewed in the direction of the arrows, and particularly showing the division of the air scoop by the partition wall thereof.

Referring to FIGS. 3, 4 and 5, there is illustrated an alternative embodiment of the present invention in which the air scoop is located on the roof of the motor vehicle with a forward-facing air intake. Those elements of the alternative embodiment which correspond to the elements of the embodiment of FIGS. 1 and 2 are designated by primed like reference numerals. Air scoop 70 is fundamentally a box open on one side and includes a top wall 72, a bottom wall 74, side walls 76 and 78, and rear wall 80, with forward-facing opening 82. Air scoop 70 is divided interiorly by a partition wall 84 oriented vertically and generally parallel with side walls 76 and 78 so as to be aligned with the air stream entering the air scoop. Partition wall 84 includes a forward portion 86 oriented vertically but being inclined at an angle relative to side wall 76, and joined thereto, so as to deflect air entering air scoop 70 to one side of partition wall 84.

Disposed behind forward portion 86 in the direction of air flow is a vertically oriented conduit 88 which passes through bottom wall 74 of air scoop 70 and through vehicle shell 18'. Conduit 88 is cut off at an angle at the top end thereof with the higher extension of the cut off top end being at the rear of conduit 88. An annular flange 90 attaches conduit 88 to the top of vehicle shell 18'. The lower end of conduit 88 communicates with filter bag 54' which is attached thereto in like manner to the attachment of filter bag 54 to conduit 42 of the first embodiment described above. Rear wall 80 of air scoop 72 includes water drain holes 92 therethrough at the juncture of rear wall 80 and bottom wall 74.

As vehicle 10' is moving forward, ram air enters front opening 82 of air scoop 72 where it is directed by side wall 78 and partition wall 86 and 84 into a first air flow chamber 94 in which the air flows generally rearwardly. Upon encountering rear wall 80, the air flow is reversed and flows around the rear end of partition wall 84 (which does not extend all the way to the rear wall 80) and thence forwardly toward conduit 88, whereupon the air flows downwardly through conduit 88 into filter bag 54'. Any water drops which may be entrained with the air entering air scoop 72 (such as from rain) become separated from the air flow by the reversal of flow direction and precipitate out on the bottom wall 74. A slight air flow through water drain holes 92 helps direct the precipitated water through drain holes 92 and out of air scoop 72, which prevents the entry of water into the motor vehicle.

In motor vehicles equipped with a factory installed ventilation system which introduces outside air into the passenger compartment in the vicinity of the dashboard, it is preferred that such introduction of outside air be disabled by selecting recirculation of interior air. Where this is not permitted by the factory ventilation system, it is preferable to attach a filter bag to the air discharge duct of the factory ventilation system to avoid introduction of particulates into the vehicle via this route.

In keeping with the general object of the invention of improving the aesthetics of a vehicle through reduced dust accumulation, and continuing to improve thereon, alternatively one could utilize an air filter bag having activated charcoal therein for absorption of odors entering the vehicle or having a perfume for adding a pleasant smell to the incoming air.

A further improvement upon the basic invention described herein involves the incorporation of a commercially available electrostatic air cleaner within the vehicle, such as one of those made by Electro-Air, Honeywell and others. Such an electrostatic air cleaner when incorporated into a motor vehicle can provide clean air, especially in public transportation vehicles such as trains, buses, airplanes and ambulances, and also in luxury automobiles. As used herein the term clean air means air having the particulate pollutants removed therefrom such as pollen, spores, bacteria, viruses, dust, carbon black, oil and tobacco smoke, and other airborne particles down to about 0.001 micron diameter.

While the present invention has been particularly described in terms of a preferred embodiment, it will be understood that the invention is not limited thereby. Therefore, it is intended that the scope of the invention include any variations, uses or adaptations of the invention following the general principles thereof and including such departures from the disclosed embodiment as come within known or customary practice in the art to which the invention pertains and which fall within the appended claims or the equivalents thereof.

What is claimed is:

1. A filtered positive ventilation system for a vehicle for alleviating entry of dust therein comprising:
   an air intake opening through a front wall of the motor vehicle, said intake opening being the only deliberate forward facing air permeable opening in the vehicle;
   an air scoop connected to the front wall of the vehicle and communicating with said intake opening, said air scoop being arranged and configured to direct air impinging on the front wall of the motor vehicle due to forward motion thereof into said air intake opening, said air scoop including a front wall positioned in front of said intake opening, said air scoop including side and top walls for defining with the vehicle front wall a downwardly facing opening and air passage for guiding air to said intake opening;
   conduit means disposed interiorly of said vehicle and communicating at one end exclusively with said intake opening;
   air filter means disposed interiorly of said vehicle and communicating exclusively with the other end of said conduit means and being sealed thereto such that all air entering said vehicle through said intake opening necessarily passes through said air filter means, said air filter means including a hollow filter bag; and
   a bulkhead located between said air filter means and the interior of the vehicle, said bulkhead including an outlet means, said air filter means including an elastic coupling means for readily removing and replacing said filter bag;
   whereby positive air pressure is generated in the vehicle by forward motion thereof to prevent air and dust infiltration into the vehicle through incidental cracks and crevices, and whereby such air as is deliberately permitted into the vehicle is filtered of particulates.

2. The ventilation system of claim 1, in which said filter bag includes activated charcoal therein.

3. The ventilation system of claim 1, in which said filter bag includes a perfume.

4. The ventilation system of claim 1, in which said air filter means includes a quick disconnect means for quickly disconnecting said air filter means from said conduit means.

5. The ventilation system of claim 1, in which the vehicle includes a windshield and said air intake opening is located above the windshield of the vehicle.

6. A filtered positive ventilation system for a vehicle for alleviating entry of dust therein comprising:
   an air intake opening through a top wall of the vehicle, said intake opening being the only deliberate air permeable opening in the vehicle; and communicating with said intake opening, said air scoop including a forwardly facing opening, said air scoop being arranged and configured to direct air impinging thereon due to forward motion of the motor vehicle into said air intake opening, said air scoop being partitioned into air inflow and outflow passages connected by an air turning passage, said air scoop including water drain holes adjacent the vehicle top wall;
   conduit means disposed interiorly of said vehicle and communicating at one end exclusively with said intake opening, an end portion of said conduit means extending above said vehicle top wall so that impinging air must flow over said extended end portion before entering said conduit means;
   air filter means disposed interiorly of said vehicle and communicating exclusively with the other end of said conduit means and being sealed thereto such that all air entering said vehicle through said intake opening necessarily passes through said air filter means, said air filter means including a hollow filter bag; and
   including a bulkhead located between said air filter means and the interior of the vehicle, said bulkhead including an outlet means, said air filter means including an elastic coupling means for readily removing and replacing said filter bag;
   whereby positive air pressure is generated in the vehicle by forward motion thereof to prevent air and dust infiltration into the vehicle through incidental cracks and crevices, and whereby such air as is deliberately permitted into the vehicle is filtered of particulates.

7. The ventilation system of claim 6, in which said filter bag includes activated charcoal therein.

8. The ventilation system of claim 6, in which said filter bag includes a perfume.

9. The ventilation system of claim 6, in which said air filter means includes a quick disconnect means for quickly disconnecting said air filter means from said conduit means.

* * * * *